United States Patent
West

(10) Patent No.: US 6,366,427 B1
(45) Date of Patent: Apr. 2, 2002

(54) SINGLE DISC CLAMP NUT FOR DISC CLAMPING IN A DISC DRIVE

(75) Inventor: Terence Hayden West, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/539,957

(22) Filed: Mar. 31, 2000

Related U.S. Application Data

(60) Provisional application No. 60/130,298, filed on Apr. 21, 1999.

(51) Int. Cl.$^7$ .............................................. G11B 17/038
(52) U.S. Cl. ................................. 360/99.12; 360/98.08
(58) Field of Search .......................... 360/97.01, 98.01, 360/98.02, 98.07, 98.08, 99.01, 99.04, 99.05, 99.08, 99.12; 369/270, 271

(56) References Cited

U.S. PATENT DOCUMENTS

| | | | |
|---|---|---|---|
| 4,561,035 A | * 12/1985 | McDorman et al. | 360/99.12 |
| 4,918,545 A | 4/1990 | Scheffel | 360/98.08 |
| 5,452,157 A | * 9/1995 | Chow et al. | 360/98.08 |
| 5,517,374 A | 5/1996 | Katakura et al. | 360/98.07 |
| 5,517,376 A | 5/1996 | Green | 360/98.08 |
| 5,694,269 A | 12/1997 | Lee | 360/98.08 |
| 5,712,746 A | 1/1998 | Moir et al. | 360/98.08 |
| 5,724,209 A | 3/1998 | Duncley et al. | 360/98.08 |
| 5,744,882 A | 4/1998 | Teshima et al. | 310/67 R |
| 5,801,901 A | 9/1998 | Bryan et al. | 360/98.08 |
| 5,847,900 A | 12/1998 | Iwabuchi | 360/98.08 |
| 5,886,852 A | 3/1999 | Kikuchi et al. | 360/98.08 |
| 5,943,184 A | * 8/1999 | Kelsic et al. | 360/98.08 |

FOREIGN PATENT DOCUMENTS

| | | |
|---|---|---|
| DE | 42 14 127 A1 | 11/1992 |
| EP | 0 166 188 A2 | 4/1985 |
| EP | 0 366 311 A | 5/1990 |
| WO | WO 95/23410 | 8/1995 |

OTHER PUBLICATIONS

"Hard Disk Drive Clamp with High Compliance and Low Redial Load" IBM Technical Disclosure Bulletin, IBM Corp., New York, US. vol. 36, No. 10, Oct. 1, 1993. pp. 73–74.

"Method for Disk File Disk Clamping" J.R. Reidenbach. IBM Technical Disclosure Bulletin. IBM Corp., New York, US. vol. 24, No. 6. Nov. 1981. pp. 2765–2766.

* cited by examiner

*Primary Examiner*—David L. Ometz
(74) *Attorney, Agent, or Firm*—Paul J. Prendergast; Merchant & Gould P.C.

(57) ABSTRACT

An apparatus and method for securing an information storage disc within a disc drive incorporates a spindle motor, a rotatable spindle hub, a disc clamp and a disc clamp nut. The disc clamp is positioned on the rotatable spindle hub to clamp the information storage disc to the spindle motor. The disc clamp defines a middle annular raised portion for accepting a predetermined pre-load force to compress the disc clamp down onto the information storage disc. The pre-load force is perpendicular to the disc clamp, and is applied symmetrically around a spindle motor axis of rotation. The disc clamp nut includes a flat engagement surface that secures the pre-loaded disc clamp to the hub. The pre-load force is released once the disc clamp nut is positioned so as to secure the disc clamp to the hub of the disc drive spindle motor. A series of substantially parallel engagement surfaces on the disc clamp nut, disc clamp and hub ensure that the pre-load force is uniformly applied to the information storage disc. The engagement surfaces between the disc clamp, hub and information storage disc can also be co-planar.

13 Claims, 4 Drawing Sheets

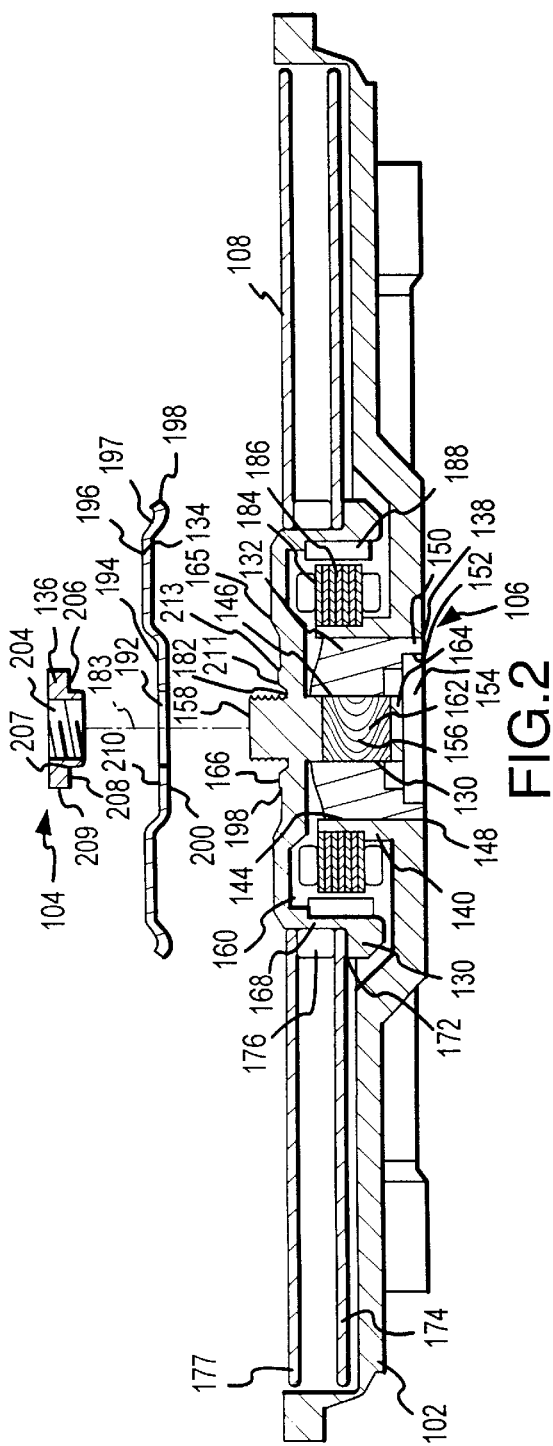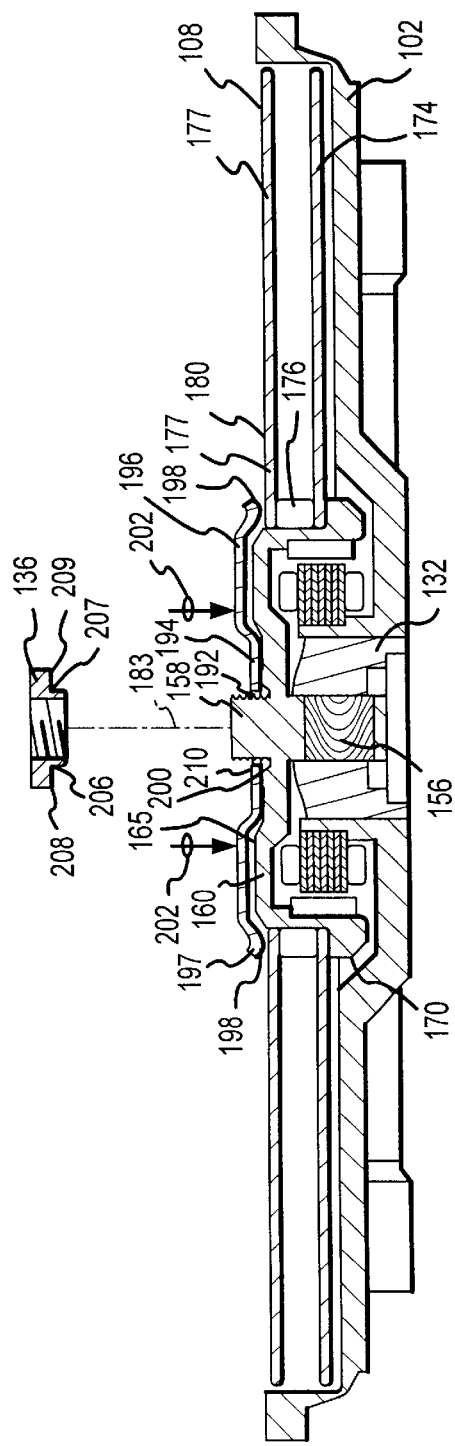

SINGLE DISC CLAMP NUT FOR DISC CLAMPING IN A DISC DRIVE

RELATED APPLICATIONS

This application claims the benefit of priority of U.S. Provisional Patent Application Serial No. 60/130,298 entitled "SINGLE NUT FOR DISC CLAMP," filed Apr. 21, 1999.

FIELD OF THE INVENTION

This application relates to magnetic disc drives and more particularly to an improved disc drive spindle motor apparatus for mounting information storage disc within the disc drive.

BACKGROUND OF THE INVENTION

Disc drives are data storage devices that store digital data in magnetic form on a storage medium on a rotating information storage disc. Modern disc drives include one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g., a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Spindle motor assemblies often utilize a rotating spindle hub journaled to a non-rotatable spindle shaft. A disc clamp is typically secured to the rotating spindle hub to exert a downward axial force on the mounted information storage discs and disc spacers. Typically, the disc clamp exerts the downward force through a series of radially positioned screws torqued into the spindle hub. The radial positioning of the screws is beneficial for exerting clamping force on the spindle assembly because the force is exerted at the periphery of the clamp in closer proximity to the mounted information storage discs and disc spacers. However, the peripheral positioning of the series of screws in the disc clamp causes the downward force to be exerted in a non-uniform manner. Non-uniform clamping force can generally cause variations in the load force and, as a result, cause the top mounted information storage disc to be physically distorted. Distortion of the top disc, even by as little as 100 micro inches, can lead to operational errors during recording and reproduction of data on the information storage disc.

In a second type of spindle motor assembly the spindle shaft and spindle hub portion both rotate about a bearing sleeve. Here, a single screw can be used to secure the disc clamp to the rotating spindle shaft because the shaft rotates with the screw (as opposed to the non-rotatable shaft where a plurality of screws must be positioned about the shaft). However, in order to develop a clamping force with a single screw similar to the force developed by the plurality of screws surrounding the non-rotatable shaft, it is necessary to apply a much higher torque to the single screw. This relative high torque can lead to a number of problems including over-stressing the spindle shaft bearing and the generation of particles during the torquing process. These high-torque related problems can damage the bearing and lead to failure of the spindle motor. Currently, there is a need in the relevant art to overcome the shortcomings of the traditional single screw disc drive spindle motor assembly as well as the non-rotatable multiple screw spindle shaft spindle motor.

SUMMARY OF THE INVENTION

Against this backdrop the present invention has been developed. The present invention is an apparatus and method for uniformly loading information storage discs onto a spindle motor.

In accordance with a preferred method of the present invention, an information storage disc is assembled on a hub of a disc drive spindle motor and a disc clamp is positioned on the hub so that an outer periphery of the disc clamp engages a top surface of the assembled information storage disc. A predetermined pre-load force is applied to the disc clamp. A disc clamp nut is positioned on the pre-loaded disc clamp to secure the disc clamp to the hub and, once secured, the pre-load force is released from the disc clamp.

The present invention can further be implemented as a disc drive spindle motor assembly including a spindle having a shaft and a cylindrical hub extending radially outward from the shaft, the shaft including a threaded stud extending above a top surface of the cylindrical hub. One or more information storage discs are mounted on the cylindrical hub. A disc clamp having a central aperture, an inner annular contact portion, a middle annular raised portion and a peripheral edge is fitted over the threaded stud to allow the inner annular contact portion to engage the top surface of the hub while the peripheral edge engages the top surface of the information storage disc. The middle annular raised portion extends above the top surface of the hub and is adapted to receive a pre-load force. A disc clamp nut having a contact surface for engaging the inner annular contact portion of the disc clamp is fastened to the threaded stud and secures the pre-loaded disc clamp to the hub.

These and various other features as well as advantages which characterize the present invention will be apparent from a reading of the following detailed description and a review of the associated drawings.

BRIEF DESCRIPTION OF THE DRAWINGS

FIG. 2 is a representative sectional view of a disc clamping assembly of the present invention showing a disc clamp nut and disc clamp exploded above a threaded stud of a spindle hub.

FIG. 3 is a representative sectional view similar to FIG. 2 illustrating the disc clamp positioned on the disc drive spindle hub and a force applied to a top surface of the disc clamp.

DETAILED DESCRIPTION

Figure 1:
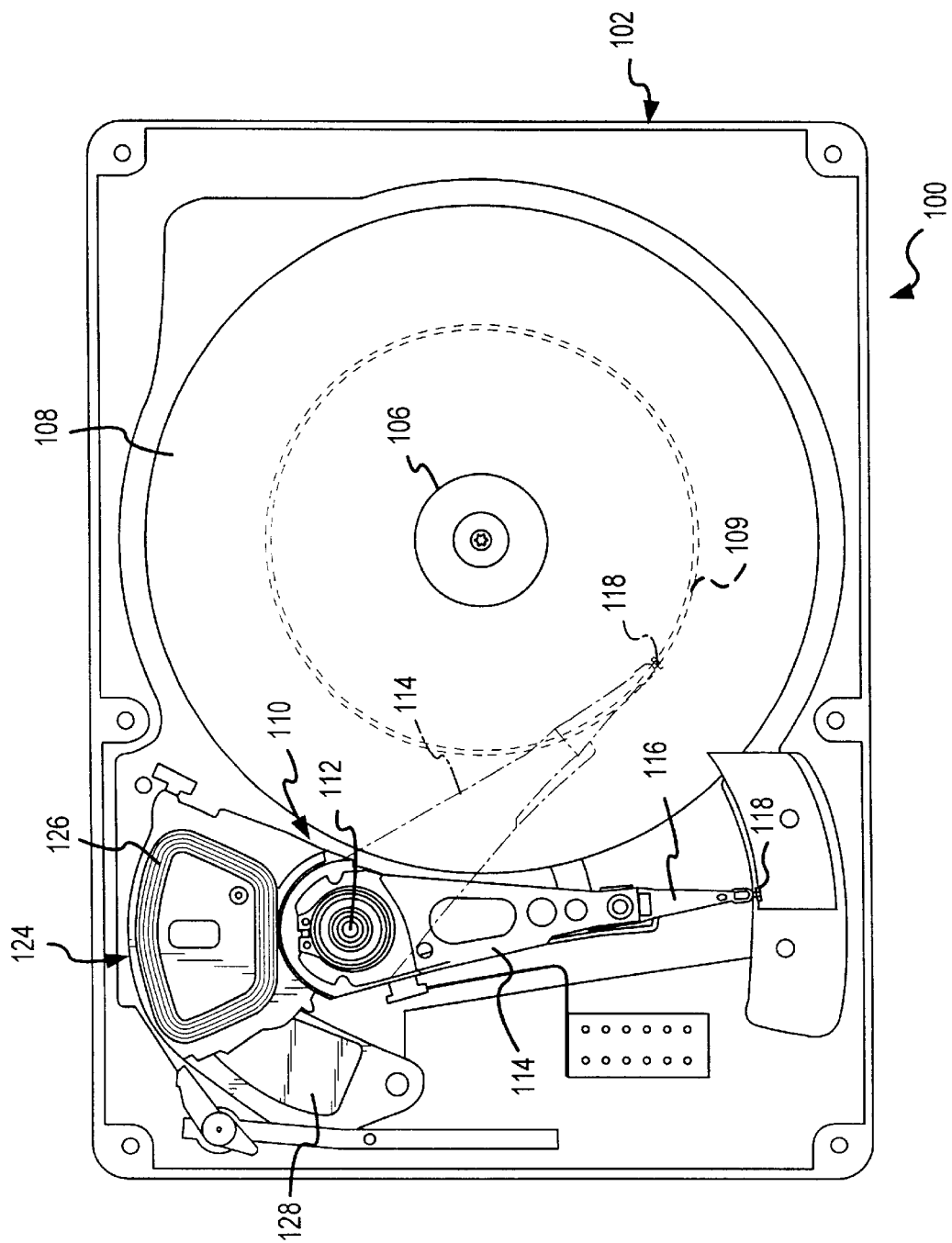
FIG. 1 is a top plan view of a disc drive with a top cover removed to illustrate a single nut disc clamping assembly in accordance with a preferred embodiment of the invention.

A disc drive 100 constructed in accordance with a preferred embodiment of the present invention is shown in FIG. 1. The disc drive 100 includes a base plate 102 to which various components of the disc drive 100 are mounted. A top cover (not shown) cooperates with the base 102 to form an internal, sealed environment for the disc drive in a conventional manner. The components include a disc drive motor spindle assembly 104 (FIG. 2) which includes a spindle motor 106 (FIG. 2) that rotates one or more information storage discs 108 at a constant high speed. Information is written to and read from tracks 109 on the discs 108 through the use of an actuator assembly 110 which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider (not shown) enabling the head 118 to fly in close proximity above the corresponding surface of the associated information storage disc 108.

The radial position of the heads 118 is controlled through the use of a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A representative sectional view of the disc drive spindle motor assembly 104 of the present invention is shown in FIG. 2. The disc drive spindle motor assembly 104 generally includes a spindle motor 106, a rotatable spindle 130, a bearing sleeve 132, one or more information storage discs 108, a disc clamp 134 and a disc clamp nut 136.

In more detail, the generally rectangular shaped base plate 102 acts as a platform for the disc drive spindle motor assembly 104 by defining an indentation 138 that provides a cylindrical wall 140 extending vertically upward from the base plate 102.

The bearing sleeve 132 defines an exterior sleeve wall 144 and an interior central cavity wall 146. The bearing sleeve 132 is positioned within the confines of the cylindrical wall 140 and is of a diameter such that the exterior sleeve wall 144 is secured to an interior engagement surface 142 of the cylindrical wall 140. The bearing sleeve's central cavity wall 146 is also cylindrical in shape and defines a central cavity receiving a rotating shaft 156 of the spindle 130 within the central cavity of the bearing sleeve 132. The bottom portion 148 of the bearing sleeve 132 defines a downwardly extending peripheral ring 150 that forms part of the bottom surface of the base plate 102. Interior and adjacent to the peripheral ring 150 is an annular notch 152 for receiving a thrust plate 154 for supporting the rotating shaft 156 of the spindle 130.

The spindle 130 includes a threaded stud 158 at a top end of the shaft 156. A hub 160 extends radially from the spindle shaft 156. The shaft 156 is cylindrical and preferably includes a series of helical oil lubricating grooves 162 coined thereon where the grooves are for lubricating the shaft 156 while the shaft is being rotated within the bearing sleeve 132. The shaft 156 is journaled to the central cavity wall 144 of the bearing sleeve 132 so that the shaft 156 of the spindle 130 is anchored to the base plate 102 but remains freely rotatable within the bearing sleeve 132. A lower end 164 of the shaft 156 is secured to the thrust plate 154 where the thrust plate 154 provides the spindle 130 with surfaces for absorbing the thrust loads generated by the rotating of the disc drive spindle motor assembly 104.

Figure 4:
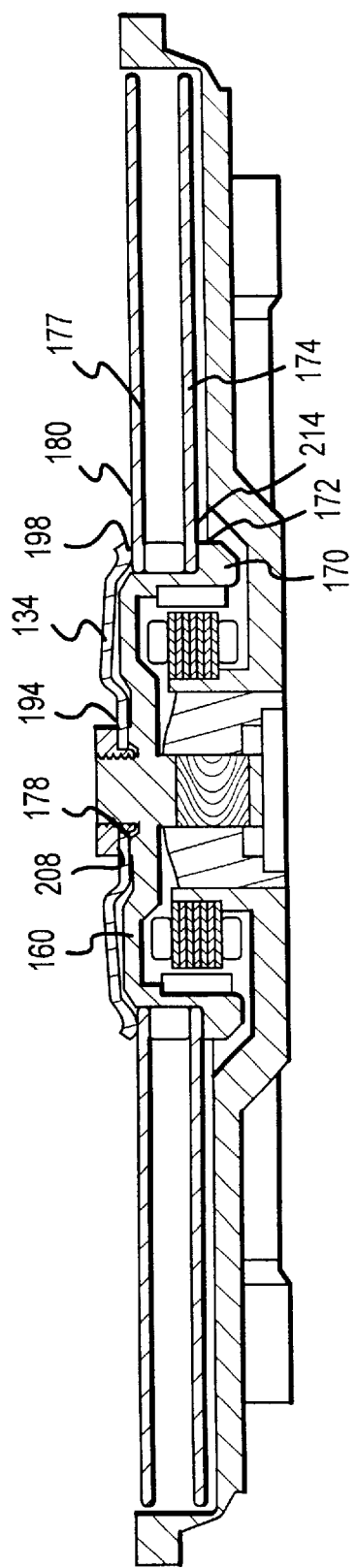
FIG. 4 is a representative sectional view of the disc clamping assembly similar to FIG. 3 showing the disc clamp and disc clamp nut positioned on the disc drive spindle hub.

The hub 160 of the spindle 130 has a top surface 165 which further defines a top interior annular shoulder 166 and a downwardly projecting peripheral ring 168. The end of the peripheral ring defines an annular flange 170 having a loading surface 172 for receiving a bottom information storage disc 174. An annular disc spacer 176 is stacked on the bottom information storage disc 174. A top information storage disc 177 is stacked on the disc spacer 176. While two discs 174 and 177 are shown in FIGS. 2–4, it is envisioned that more than two discs and one corresponding spacer 176 may be used with the current invention. Furthermore, the present invention encompasses the use of a single information storage disc secured between the bottom annular flange 170 and the disc clamp 134.

The top interior annular shoulder 166 defines a flat engagement surface 178 (FIG. 2) adjacent to the threaded stud 158 of the spindle shaft 156. Preferably, the flat engagement surface 178 of the top interior annular shoulder 166 is formed substantially parallel to the loading surface 172 of the annular flange 170. An indentation 182 is formed adjacent to the top interior annular shoulder 166, surrounding the vertically extending threaded stud 158, for receiving the disc clamp nut 136 as described below.

The threaded stud 158 defines external threads that are both perpendicular to a spindle assembly axis of rotation 183 and concentric with the peripheral ring 168 of the hub 160. The threaded stud 158 need only be of such length and size to effectively mate with the disc clamp nut 136 as is described in greater detail below.

The spindle 130 is rotated about the spindle axis of rotation 183 by a spindle motor 106 having a stator core 184 around which a coil 186 is wound. Cooperating with the stator core 184 to rotate the spindle 130 is a cylindrical magnet 188 mounted to an interior surface 190 of the downwardly projecting peripheral ring 168 of the spindle hub 160. When current is supplied to the coil 186, a magnetic field is established around the relevant pole of the stator core 184 causing torque, and thus rotation, between the stationary cylindrical wall 140 of the base plate 102 and the spindle 130 of the present invention.

The disc clamp 134, best shown in FIG. 2, includes a centrally located aperture 192, an inner annular spindle contact portion 194, a middle annular raised portion 196 and an outer periphery 197 that further defines a downward projecting peripheral edge 198. FIG. 3 illustrates that the aperture 192 of the disc clamp 134 is mounted over the threaded stud 158 of the spindle 130. The inner annular spindle contact portion 194 defines a bottom surface 200 that is flat and preferably positioned in a plane substantially parallel to the loading surface 172 of the annular flange 170 and the hub flat engagement surface 178.

The disc clamp nut 136, having a central threaded aperture 204, defines a shoulder 206 having a flat engagement surface 208 for interacting with a flat top surface 210 of the inner annular spindle contact portion 194 of the disc clamp

134. The flat engagement surface 208 is generally parallel to the loading surface 172 of the annular flange 170 and the hub flat engagement surface 178. The disc clamp nut shoulder 206 preferably includes an inside and outside diameter 207 and 209 that are equal to the respective inner and outer diameter 211 and 213 (FIG. 2) of the annular flat engagement surface 178 of the spindle hub 160.

As has been noted above, it is important that the flat engagement surface 208 of the disc clamp nut 136, the inner annular spindle contact portion 194 of the disc clamp 134 and the flat engagement surface 178 of the top interior annular shoulder 166 all be substantially parallel to the loading surface 172 of the annular flange 170, and hence be parallel to each other. The "parallelism" between these surfaces is important for uniformly pre-loading the disc clamp 134 to clamp the information storage discs as discussed in greater detail below.

In use, the disc clamp 134 is positioned over the threaded stud 158 of the spindle 130 as shown in FIG. 3. The disc clamp's inner annular spindle contact portion 194 engages the flat engagement surface 178 on the inner annular shoulder 166 of the hub 160 while the middle annular raised portion 196 of the disc clamp 134 projects radially across the spindle hub 160 without contact and the downwardly projecting peripheral edge 198 contacts the top surface 180 of the information storage disc 177 at a position adjacent the spindle hub 160 and directly above and in line with the spacer 176 and radial flange 170 of the hub. Once the disc clamp 134 is in position over the threaded stud 158, a predetermined downward pre-load force, shown in FIG. 3 as arrow 202, is applied to the middle annular raised portion 196 of the disc clamp. The pre-load force axially compresses the disc clamp 134 down on the spindle mounted information storage disc 177. The pre-load force 202 is preferably supplied by air pressure, but may be supplied by other compression means. It is envisioned that the pre-load force be applied in a symmetrically annular fashion around the spindle motor axis of rotation 183 and be directly aligned with the axis of rotation. It is also envisioned that each spindle motor receive the same predetermined amount of pre-load force 202 thus ensuring little clamping force variation between spindle motor units. While the disc clamp is in the compressed position, the disc clamp nut 136 is mated to the threaded stud 158 of the spindle to secure the pre-loaded disc clamp to the mounted information storage disc 177. It is envisioned that the pre-load force applied to the disc clamp be such that only 15–35 inch-ounces of torque be required to secure the disc clamp nut 136 onto the threaded stud 158 of the spindle 130.

FIG. 4 shows a deflected disc clamp 134 compressed between the substantially parallel surfaces of the disc clamp nut shoulder surface 208, the flat engagement surface 178 of the hub 160, the top surface 180 of the top information storage disc 177 and the loading surface 172 of the annular flange 170. The substantially parallel orientation of the surfaces 178, 194 and 208 with surface 172 ensures that the disc clamp's distributed load is uniform and normal to the top surface of the information storage disc 177. An equal and opposite reaction force, between bottom surface 214 and the bottom information storage disc 174 and the loading surface 172 of the spindle hub annular flange 170, results from the normal force. The two forces (normal and reaction) create a friction force in the plane of all mating surfaces which prevents the components of the spindle assembly 106 from shifting relative to each other when the disc drive 100 is in use or is subjected to high levels of shock and vibration.

An additional feature of the present invention is that in selecting the diameter of the disc clamp nut shoulder surface 208 and the flat engagement surface 178 of the spindle hub interior annular shoulder 166 to be equal to each other, the normal force exerted on the top information storage disc remains perpendicular, and not offset, to the spindle axis of rotation 183.

Finally, as illustrated in FIG. 4, it is preferable that when the disc clamp is deflected by pre-load force 202, that the inner annular spindle contact portion 194 of the disc clamp, the downward projecting peripheral edge 198 of the disc clamp, the flat engagement surface 178 of the hub 160 and the top surface 180 of the information storage disc 177 be approximately co-planar and substantially parallel with each other. The substantially parallel and approximately co-planar alignment of the surfaces helps ensure that the disc clamp's distributed load remains uniform and normal to the top information storage disc as the pre-load force is applied to the disc clamp.

Figure 5:
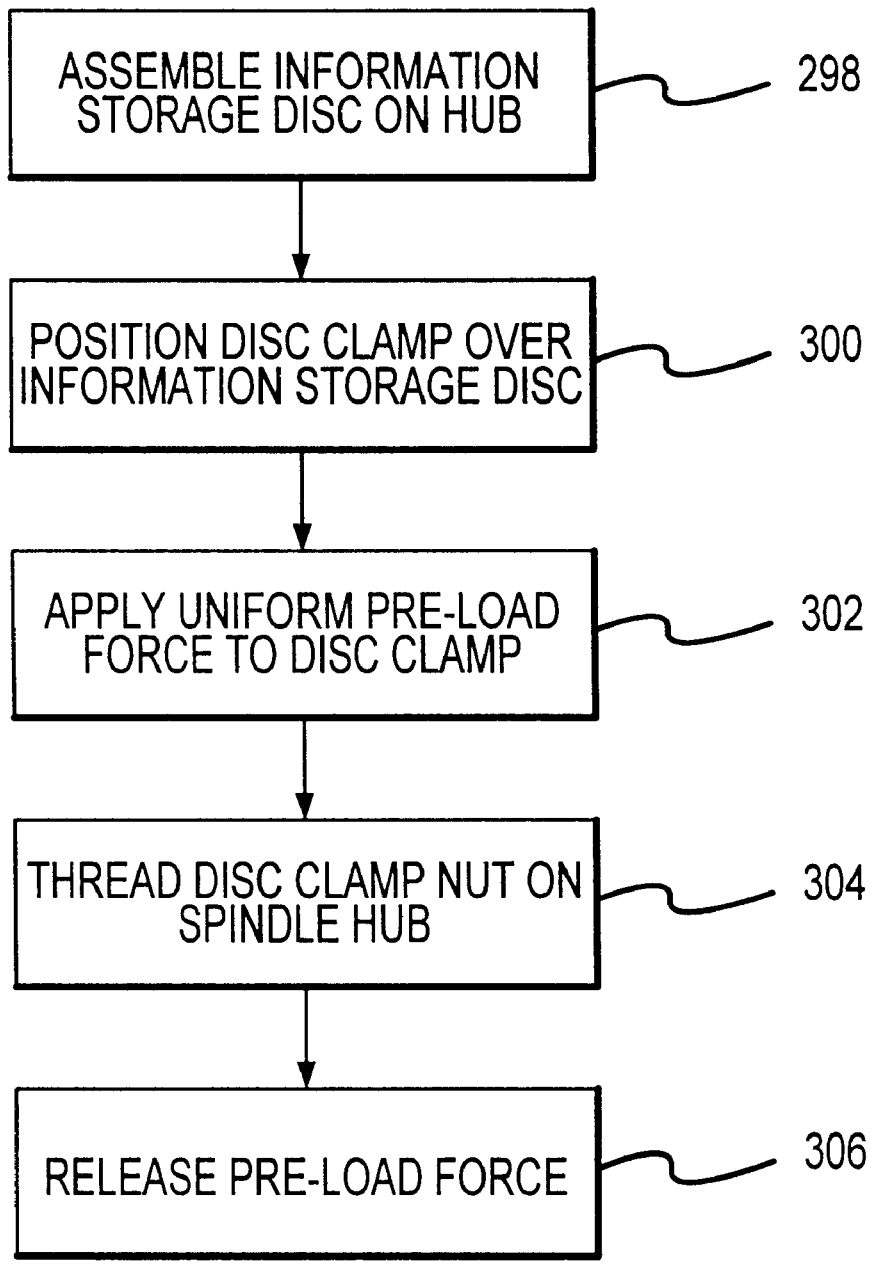
FIG. 5 is a flow chart showing the steps for assembling the single nut disc clamping assembly in accordance with a preferred embodiment of the present invention.

FIG. 5 is a flow diagram showing the steps for securing a disc clamp 134 on a disc drive spindle assembly utilizing the preferred embodiment of the present invention. In operation 298, the information storage disc is assembled on the hub of the disc drive spindle motor. In operation 300, the disc clamp is positioned over an information storage disc on the spindle motor. In operation 302, a uniform pre-load force is applied normal to the information storage disc so as to deflect the disc clamp to a predetermined compressed position. In operation 304, while the pre-load force compresses the mounted information storage disc and disc spacer, a disc clamp nut is threaded on the spindle hub to secure the disc clamp to the spindle assembly. Finally, in operation 306, the pre-load force is released from the disc clamp.

Therefore, the method entails an evenly distributed predetermined pre-load force being applied to a disc clamp on a spindle motor. The spindle motor has a series of parallel surfaces that interact together under the pre-load force to ensure a uniform loading and consequent reaction force to secure the information storage disc on the spindle motor. The predetermined pre-load force ensures that the force and reaction force are aligned with the spindle axis of rotation and thus that the disc clamp is uniformly loaded onto the information storage disc.

In summary, the preferred embodiment of the invention described herein is directed to a method of securing an information storage disc (such as 108) within a disc drive (such as 100). The method includes assembling (such as in step 298) an information storage disc (such as 108) on a hub (such as 160) of a disc drive spindle motor and then positioning (such as in step 300) the disc clamp (such as 134) on the hub (such as 160) to engage the outer periphery (such as 197) of the disc clamp with the top surface (such as 180) of the information storage disc (such as 108). Next, a predetermined pre-load force (such as 202) is applied (such as in step 302) against the disc clamp. A disc clamp nut (such as 136) is positioned so as to secure the pre-loaded disc clamp to the hub of the disc drive spindle motor (such as in step 304). Once the disc clamp nut is positioned the pre-load force is released from the disc clamp (such as in step 306).

In another preferred embodiment of the present invention, the method includes loading an annular disc spacer (such as 176) and second information storage disc (such as 174) on the hub (such as 160) of the disc drive spindle motor (such as 106). Further, the predetermined pre-load force (such as 202) can be applied symmetrically around the spindle motor's axis of rotation (such as 183) and can be perpendicular to the top surface (such as 180) of the information storage disc (such as 177).

In another preferred embodiment of the present invention, the disc clamp defines an inner annular spindle contact portion (such as 194), a middle annular raised portion (such as 196) and a peripheral edge (such as 198) where the step of applying a pre-load force (such as step 302) occurs only against the middle annular raised portion (such as 196) of the disc clamp (such as 134).

In another preferred embodiment of the present invention, the hub (such as 160) defines a peripheral ring (such as 168) having an annular flange (such as 170), the annular flange (such as 170) defining an information storage disc loading surface (such as 172). The hub further defines a top surface (such as 165) having an annular shoulder (such as 166), the annular shoulder defines a flat engagement surface (such as 178) that is substantially parallel to the loading surface (such as 172) of the annular flange (such as 170), and the step of positioning the disc clamp on the hub (such as in step 300) includes positioning the inner annular spindle contact (such as 194) of the disc clamp on the flat engagement surface (such as 178) of the annular shoulder of the hub.

In another preferred embodiment of the present invention, the inner annular spindle contact portion (such as 194) of the disc clamp (such as 134) is positioned between the flat engagement surface (such as 178) of the annular shoulder (such as 166) and the disc clamp nut (such as 136).

In another preferred embodiment of the present invention, a disc clamp nut (such as 136) defines a shoulder (such as 206) having a flat engagement surface (such as 208), and the step of positioning the disc clamp nut on the hub (such as in step 304) includes the step of placing the flat engagement surface (such as 208) of the disc clamp nut in substantially parallel alignment with the flat engagement surface (such as 178) of the annular shoulder (such as 166) of the hub (such as step 304).

In another preferred embodiment of the present invention, the positioning of the disc clamp nut (such as 136) on the hub step includes placing the disc clamp inner spindle contact portion (such as 194) and peripheral edge (such as 198) approximately co-planar to the annular shoulder (such as 166) of the hub (such as 160) and top surface (such as 180) of the information storage disc (such as 177).

In another preferred embodiment of the present invention, the inner and outer diameters (such as 207 and 209) of the flat engagement surface (such as 208) of the disc clamp nut (such as 136) are substantially equal to the inner and outer diameters (such as 211 and 213) of the flat engagement surface (such as 178) of the annular shoulder (such as 166) of the hub (such as 160).

In another preferred embodiment of the present invention, the positioning of the disc clamp nut on the hub (such as in step 300) further includes the step of aligning the respective inner and outer diameters of the flat engagement surface of the shoulder portion of the disc clamp nut and the flat engagement surface of the annular shoulder of the hub.

A further exemplary preferred embodiment of the present invention includes having a disc drive spindle motor assembly (such as 104) having a spindle shaft (such as 156) and a cylindrical hub (such as 160) extending radially outward from the shaft. The spindle shaft (such as 156) further includes a threaded stud (such as 158) extending above a top surface (such as 165) of the cylindrical hub (such as 160). An information storage disc (such as 108) is mounted on the cylindrical hub (such as 160). A disc clamp (such as 134) having a central aperture (such as 204), an inner annular contact portion (such as 194), a middle annular raised portion (such as 196) and a peripheral edge (such as 198) is fitted over the threaded stud (such as 158) to allow the inner annular contact portion (such as 194) to engage the top surface (such as 165) of the hub (such as 160) while the peripheral edge (such as 198) engages the top surface (such as 180) of the information storage disc (such as 177). The disc clamp middle annular raised portion (such as 196) extends above the top surface (such as 165) of the hub (such as 160) and is adapted to receive a pre-load force (such as 202). Finally, a disc clamp nut (such as 136) is secured to the threaded stud (such as 158), where the nut includes a contact surface (such as 208) for engaging the inner annular contact portion (such as 194) of the disc clamp (such as 134) to secure the pre-loaded disc clamp to the hub.

In another preferred embodiment of the present invention, the hub top surface (such as 165) further defines an annular shoulder (such as 166) having a flat engagement surface (such as 178) substantially parallel to the loading surface (such as 172) of the annular flange (such as 170). The annular shoulder flat engagement surface (such as 178) receives the disc clamp (such as 134).

In another preferred embodiment of the present invention, the disc clamp nut (such as 136) defines a shoulder (such as 206) having a flat bottom surface (such as 208) substantially parallel to the loading surface (such as 172) of the annular flange (such as 170). The disc clamp (such as 134) is secured between the flat bottom surface (such as 208) of the disc clamp nut shoulder (such as 206) and the flat engagement surface (such as 178) of the annular shoulder (such as 166) of the hub (such as 160).

In another preferred embodiment of the present invention, the flat engagement surface (such as 208) of the disc clamp nut (such as 136) has an inner and outer diameter (such as 207 and 209) that is substantially equal to an inner and outer diameter (such as 211 and 213) of the flat engagement surface (such as 178) of the hub annular shoulder (such as 166).

In another preferred embodiment of the present invention, the disc clamp inner annular shoulder (such as 194) and peripheral edge (such as 198) are approximately co-planar to the hub's annular shoulder (such as 166) and the top surface (such as 180) of the information storage disc (such as 177).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, rather than the hub portion of the spindle motor having a threaded stud for interaction with a disc clamp nut, the hub portion could define a threaded aperture for interaction with a threaded disc clamp retaining screw having a mating tapered shoulder. Accordingly, all such modifications, changes and alternatives are encompassed in the spirit of the invention disclosed and as defined in the appended claims.

What is claimed is:

1. A method of securing an information storage disc within a disc drive, the method comprising steps of:
   (a). assembling the information storage disc on a hub of a disc drive spindle motor;
   (b). positioning a disc clamp having an inner annular spindle contact portion, a middle annular raised portion, and a peripheral edge on the hub to engage the peripheral edge of the disc clamp with a top surface of the information storage disc;
   (c). applying a predetermined pre-load force only against the middle annular raised portion of the disc clamp;

(d). positioning a disc clamp nut to secure the disc clamp to the hub of the disc drive spindle motor, and (e). releasing the pre-load force from the disc clamp.

2. The method according to claim 1, wherein the hub defines a peripheral ring having an annular flange, the annular flange defining a loading surface, and the hub further defines a top surface having an annular shoulder, the annular shoulder defining a flat engagement surface substantially parallel to the loading surface of the annular flange, and wherein the positioning step (b) further comprises positioning the inner annular spindle contact portion to engage the flat engagement surface of the annular shoulder of the hub.

3. The method according to claim 2, wherein the positioning step (d) further comprises positioning the inner annular spindle contact portion of the disc clamp between the flat engagement surface of the annular shoulder and the disc clamp nut.

4. The method according to claim 3, wherein the disc clamp nut defines a shoulder having a flat engagement surface and wherein the positioning step (d) further comprises placing the flat engagement surface of the disc clamp nut in substantially parallel alignment with the flat engagement surface of the annular shoulder of the hub.

5. The method according to claim 4, wherein the positioning step (b) further comprises placing the disc clamp inner annular spindle contact portion and peripheral edge approximately co-planar to the flat engagement surface of the annular shoulder of the hub and the top surface of the information storage disc.

6. The method according to claim 4, wherein the flat engagement surface of the disc clamp nut has an inner and outer diameter that is substantially equal to an inner an outer diameter of the flat engagement surface of the annular shoulder of the hub, and wherein the positioning step (d) further comprises aligning the respective inner and outer diameters of the flat engagement surface of the shoulder portion of the disc clamp nut and the flat engagement surface of the annular shoulder of the hub.

7. The method according to claim 4, wherein the positioning step (d) further comprises avoiding contact between the hub and the middle annular raised portion of the disc clamp.

8. A disc drive spindle motor assembly comprising:

a spindle having a shaft and a cylindrical hub extending radially outward from the shaft, the shaft including a threaded stud extending above a top surface of the cylindrical hub;

an information storage disc mounted on the cylindrical hub, the information storage disc having a top surface;

a disc clamp having a central aperture, an inner annular contact portion, a middle annular raised portion, and a peripheral edge, the central aperture of the disc clamp fitted over the threaded stud to allow the inner annular contact portion to engage the top surface of the hub while the peripheral edge engages the top surface of the information storage disc, and the middle annular raised portion extending above the top surface of the hub and adapted to receive a pre-load force; and a disc clamp nut secured to the threaded stud, the nut including a contact surface for engaging the inner annular contact portion of the disc clamp.

9. The spindle motor assembly of claim 8, wherein the hub defines a peripheral ring having an annular flange, the annular flange defining a loading surface for receiving the information storage disc and the top surface of the hub having an annular shoulder that defines a flat engagement surface for receiving the disc clamp; and the flat engagement surface of the annular shoulder is substantially parallel to the loading surface of the annular flange.

10. The spindle motor assembly of claim 9, wherein the disc clamp nut defines a shoulder having a flat bottom surface substantially parallel to the loading surface of the annular flange; and the disc clamp is secured between the flat bottom surface of the disc clamp nut and the flat engagement surface of the annular shoulder of the hub.

11. The spindle motor assembly of claim 10, wherein the flat bottom surface of the disc clamp nut has an inner and outer diameter that is substantially equal to an inner and outer diameter of the flat engagement surface of the annular shoulder of the hub.

12. The spindle motor assembly of claim 11, wherein the disc clamp inner annular spindle contact portion and peripheral edge are approximately co-planar to the hub annular shoulder and the top surface of the information storage disc.

13. The spindle motor assembly of claim 12, wherein the disc clamp inner annular spindle contact portion and peripheral edge are substantially parallel to the hub annular shoulder and the top surface of the information storage disc.

* * * * *